US011022056B2

(12) United States Patent
Shimura et al.

(10) Patent No.: US 11,022,056 B2
(45) Date of Patent: Jun. 1, 2021

(54) VEHICLE CONTROL DEVICE

(71) Applicant: Bosch Corporation, Tokyo (JP)

(72) Inventors: Tomohiro Shimura, Kanagawa (JP); Yuta Takimoto, Kanagawa (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 16/345,313

(22) PCT Filed: Aug. 30, 2017

(86) PCT No.: PCT/JP2017/031141
§ 371 (c)(1),
(2) Date: Apr. 26, 2019

(87) PCT Pub. No.: WO2018/079060
PCT Pub. Date: May 3, 2018

(65) Prior Publication Data
US 2019/0277212 A1    Sep. 12, 2019

(30) Foreign Application Priority Data
Oct. 31, 2016  (JP) .............................. JP2016-213075

(51) Int. Cl.
*F16D 41/02*    (2006.01)
*F02P 5/04*    (2006.01)
(Continued)

(52) U.S. Cl.
CPC ......... *F02D 41/0225* (2013.01); *F02D 37/02* (2013.01); *F02D 41/0002* (2013.01);
(Continued)

(58) Field of Classification Search
CPC ............. F02D 41/0225; F02D 41/0002; F02D 41/022; F02D 41/023; F02D 37/02;
(Continued)

(56) References Cited

U.S. PATENT DOCUMENTS 6,360,154 B1 * 3/2002 Krenn ................... B60W 10/06
477/155
2005/0255964 A1 * 11/2005 Heap ...................... B60W 20/30
477/3
(Continued)

FOREIGN PATENT DOCUMENTS

EP    1967430 A1 *    9/2008    ............ B60W 10/02
JP    2007162939        6/2007
(Continued)

OTHER PUBLICATIONS

International Search Report for Application No. PCT/JP2017/031141 dated Nov. 21, 2017 (English Translation, 1 page).

*Primary Examiner* — Tisha D Lewis
(74) *Attorney, Agent, or Firm* — Michael Best & Friedrich LLP

(57) ABSTRACT

A vehicle control device is capable of securing engine output torque even in a case where a switching operation is performed between a first shift position and a second shift position, both of which are in an in-gear state. The vehicle control device is capable of performing a mutual switching operation between the first shift position and the second shift position, at both of which a power transmission system is in the in-gear state, and includes: a shift-position detecting section that detects a selected shift position; and a torque reserve control section that executes torque reserve control to increase output torque of an engine when a shift switching operation is performed between the first shift position and the second shift position.

17 Claims, 9 Drawing Sheets

(51) Int. Cl.
*F16H 63/50* (2006.01)
*F02D 41/02* (2006.01)
*F02D 37/02* (2006.01)
*F02D 41/00* (2006.01)
*F02P 5/145* (2006.01)

(52) U.S. Cl.
CPC ......... *F02D 41/022* (2013.01); *F02D 41/023* (2013.01); *F02P 5/045* (2013.01); *F02P 5/145* (2013.01); *F16H 63/50* (2013.01); *F02D 2200/50* (2013.01); *F02D 2250/18* (2013.01); *F02D 2250/22* (2013.01)

(58) Field of Classification Search
CPC .. F02D 2250/18; F02D 2250/22; F02P 5/045; F02P 5/145; F16H 63/50
USPC .................................................. 477/107–144
See application file for complete search history.

(56) References Cited

U.S. PATENT DOCUMENTS

| | | | |
|---|---|---|---|
| 2013/0045835 A1* | 2/2013 | Schang | B60W 10/115 477/78 |
| 2013/0296127 A1* | 11/2013 | Shelton | B60W 10/02 477/5 |
| 2015/0155812 A1* | 6/2015 | Jang | B60W 20/00 701/22 |

FOREIGN PATENT DOCUMENTS

| | | |
|---|---|---|
| JP | 2012035780 A | 2/2012 |
| JP | 2013181460 | 9/2013 |
| JP | 2014234757 | 12/2014 |

* cited by examiner

[FIG. 1]
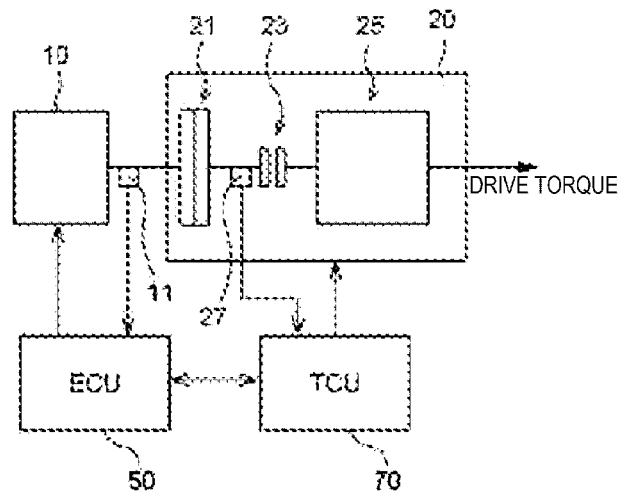
[FIG. 2]
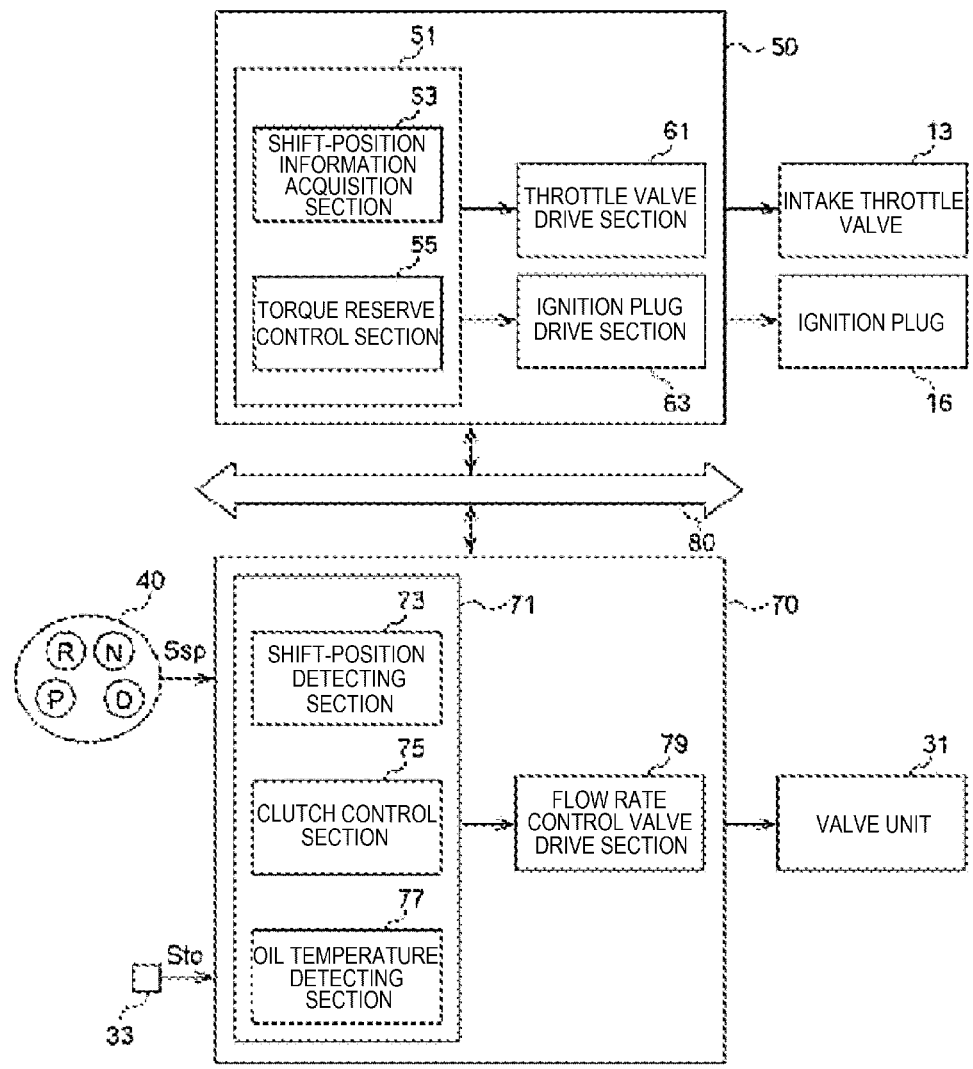

[FIG. 3]
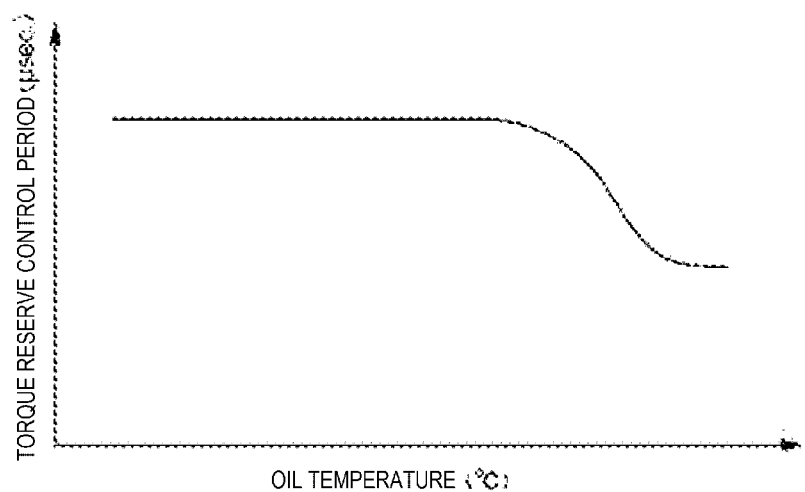
[FIG. 4]
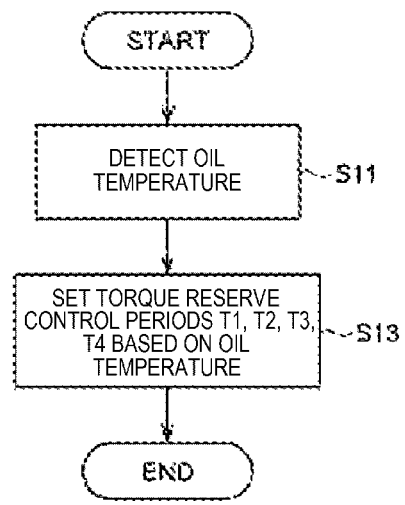

[FIG. 5]
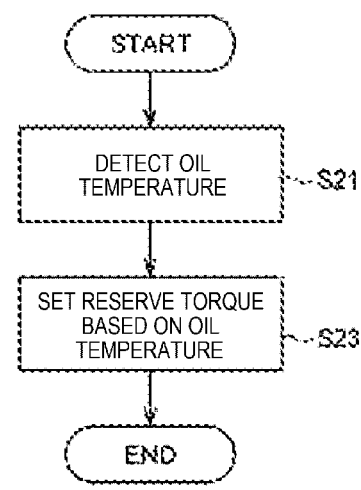
[FIG. 6]
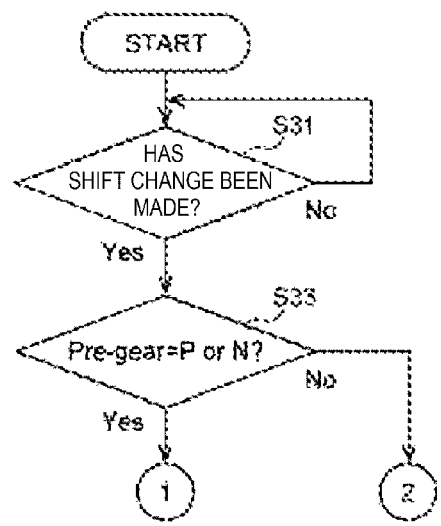

[FIG. 7]
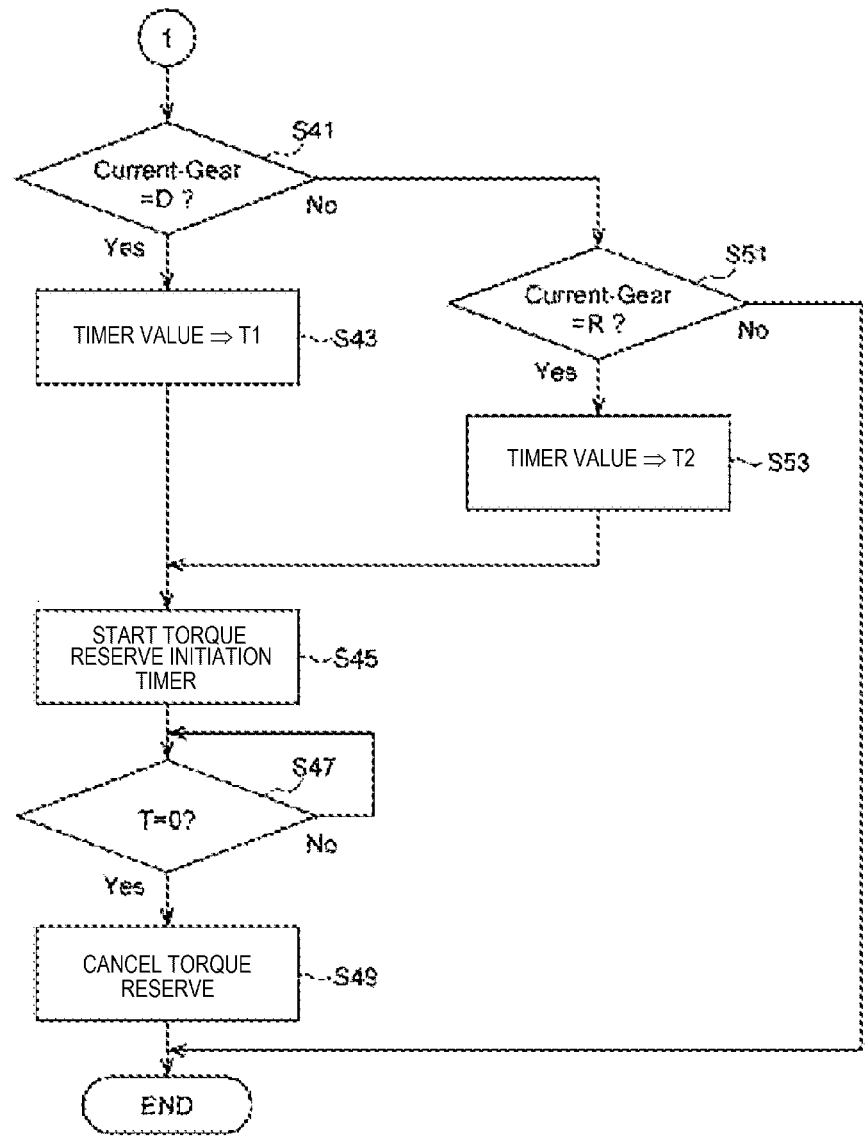

[FIG. 8]
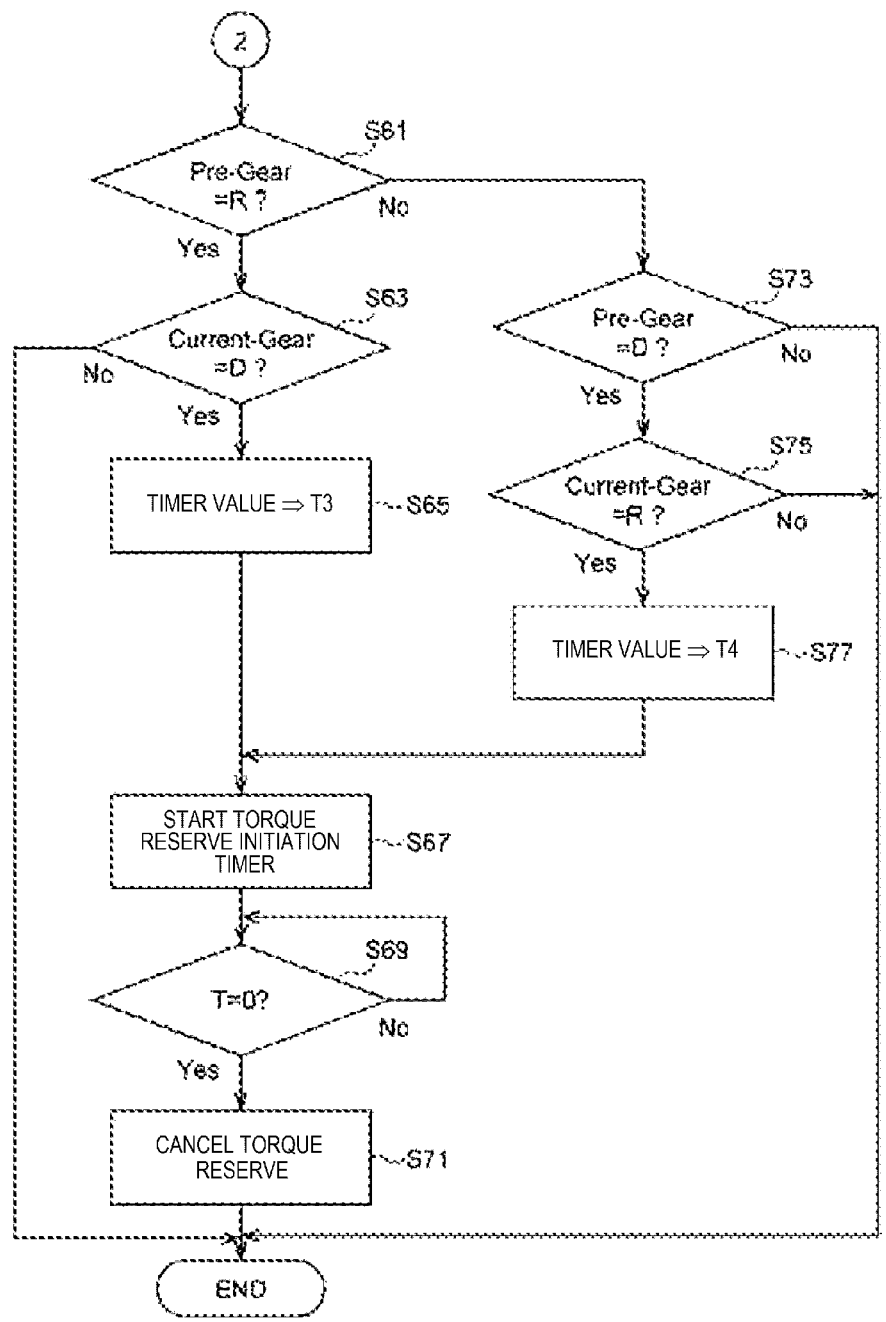

[FIG. 9]
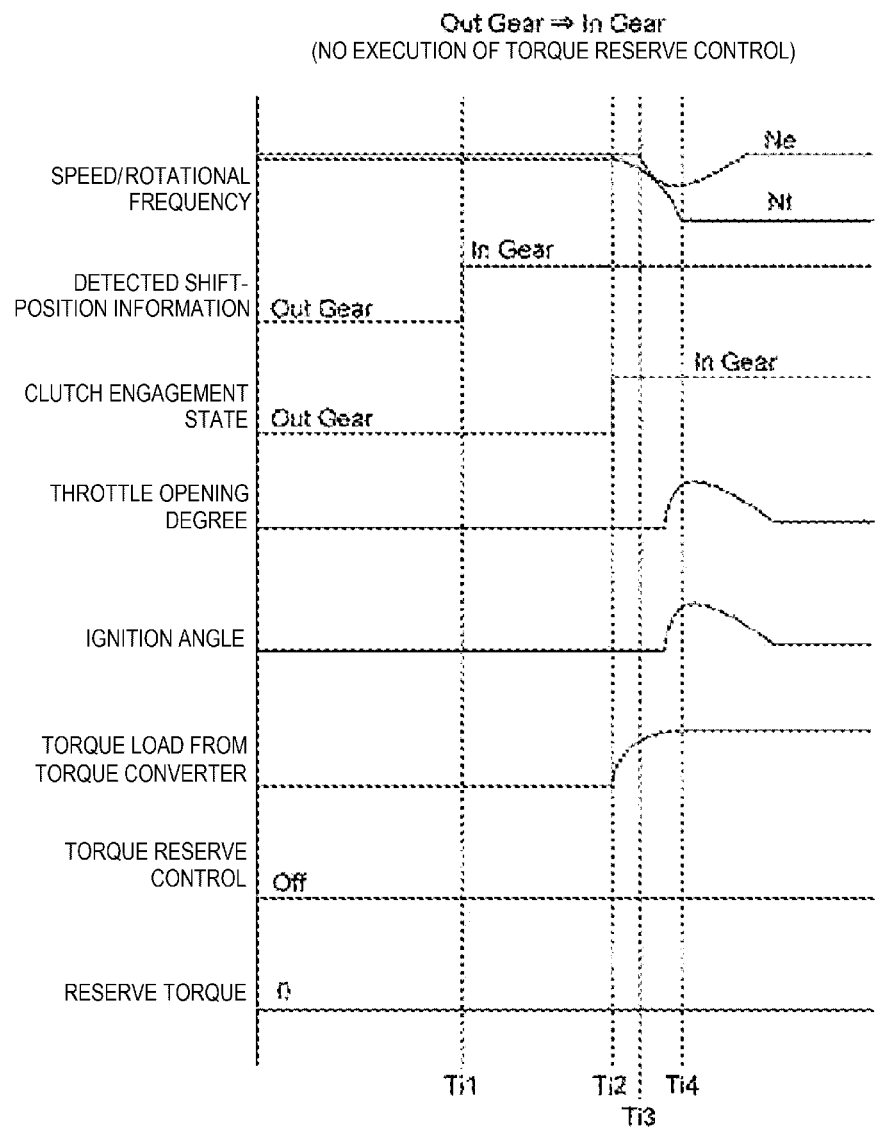

[FIG. 10]
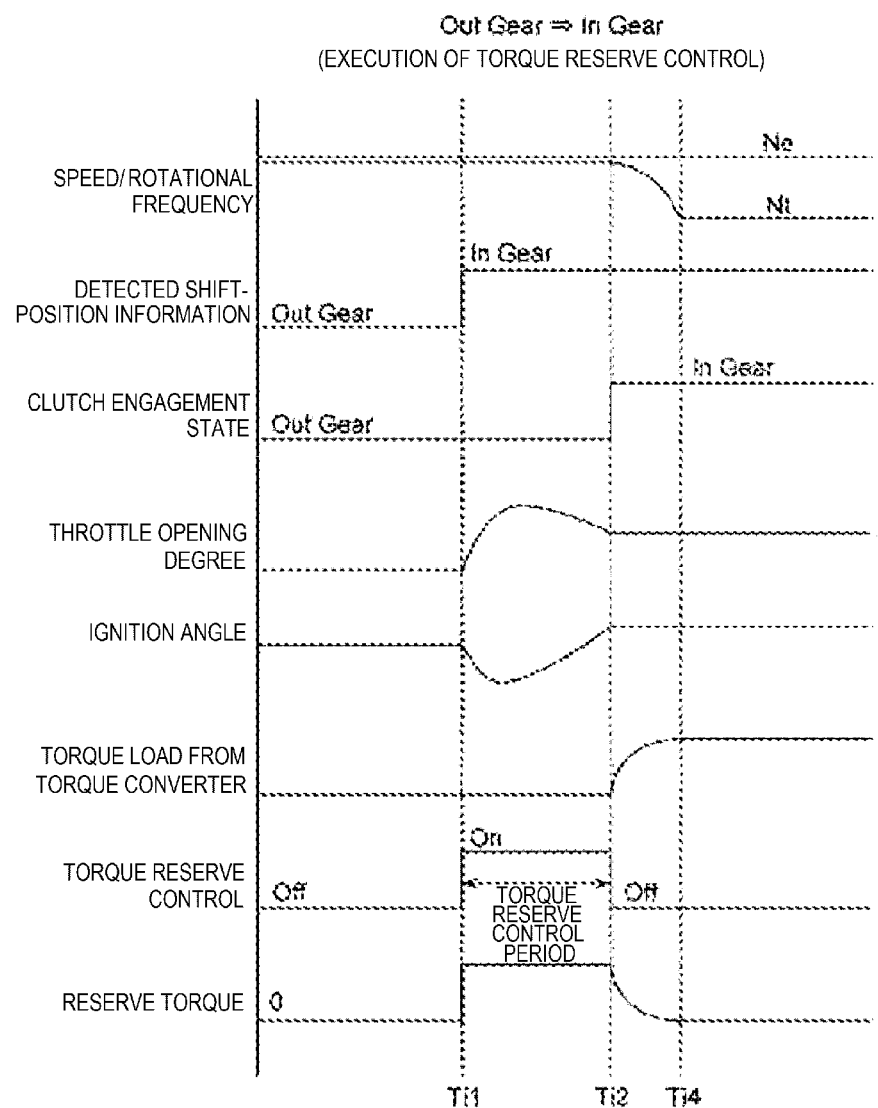

[FIG. 11]
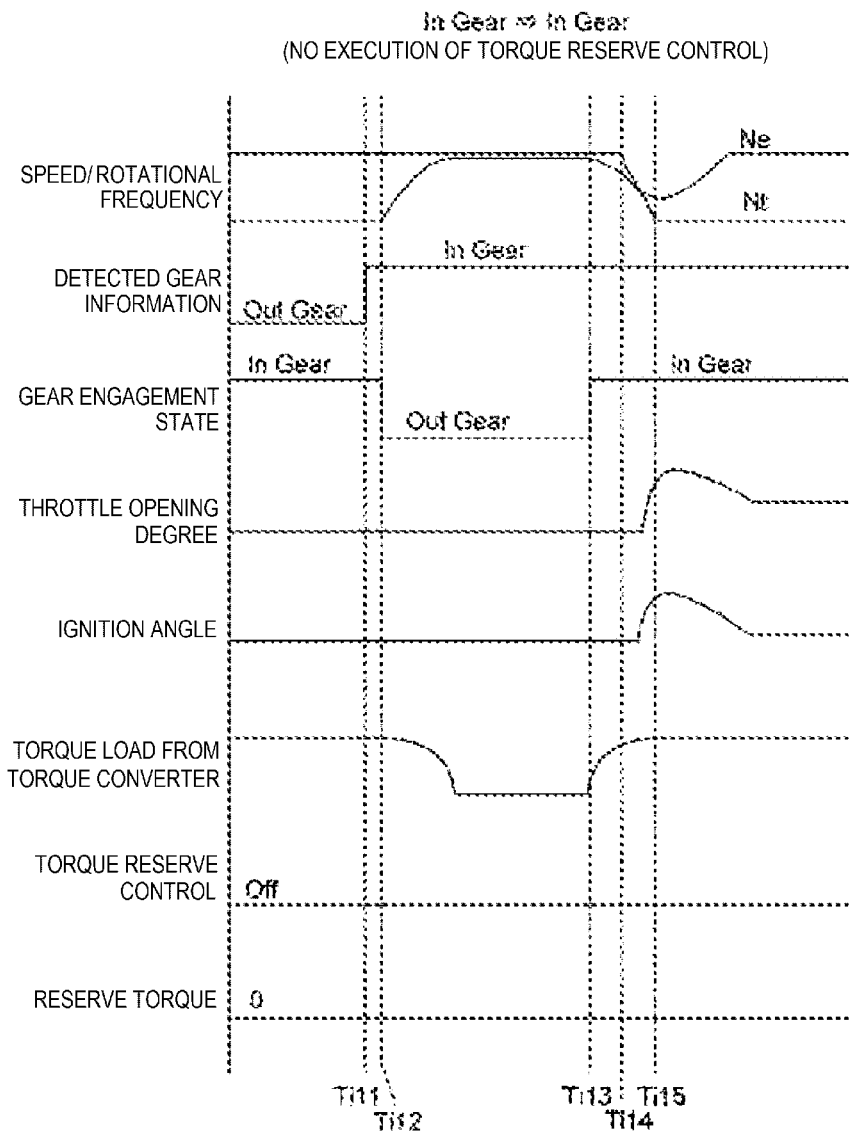

[FIG. 12]
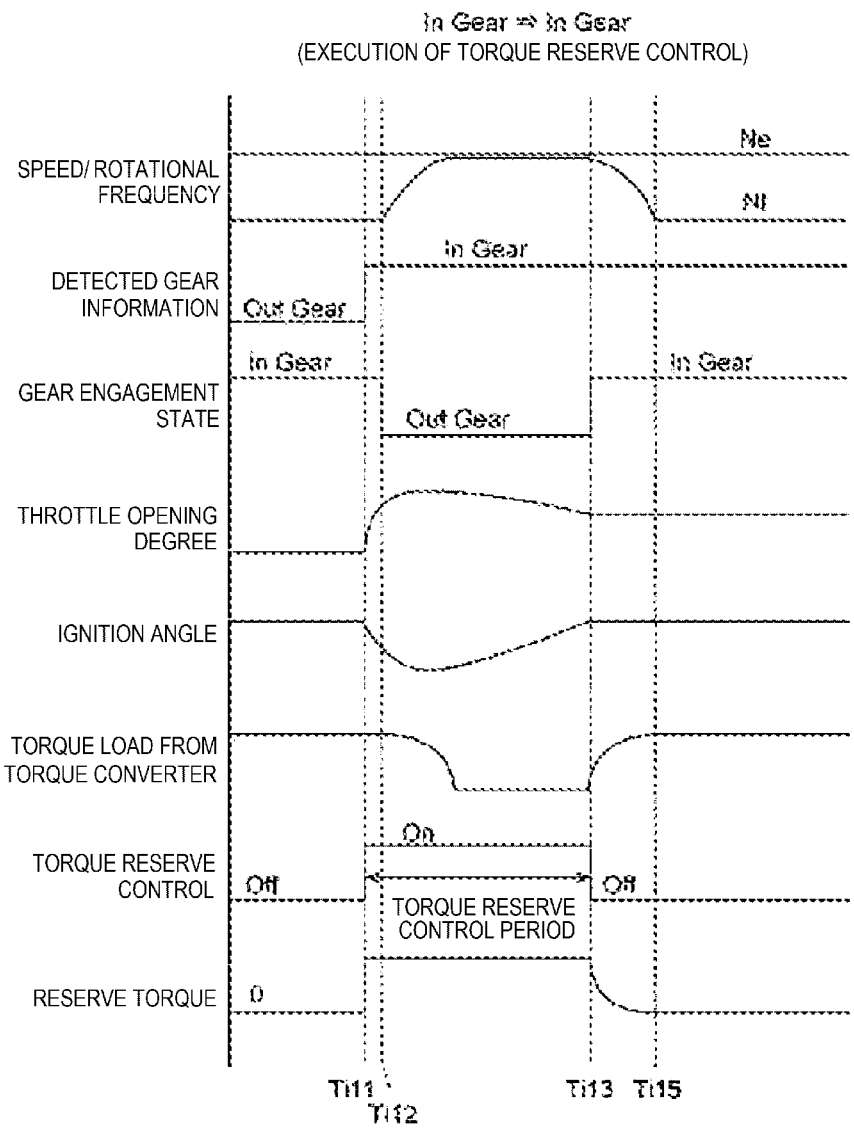

VEHICLE CONTROL DEVICE

BACKGROUND OF THE INVENTION

The present invention relates to a vehicle control device.

A vehicle such as an automobile includes a transmission that converts a rotation thereof based on drive power of an engine at a desired gear ratio to output the rotation to a driveshaft. The transmission is continuously provided from an output shaft of the engine via a torque converter as a fluid coupling. Such a transmission includes a forward/reverse changing clutch that changes a rotational direction of the driveshaft so as to switch travel of the vehicle between forward travel and reverse travel. Such a forward/reverse changing clutch includes a forward clutch and a reverse brake. In the case where a shift position selected by a driver is in a drive range, the reverse brake is disengaged, and the forward clutch is engaged. Consequently, the driveshaft rotates in a normal rotation direction, which allows the forward travel of the vehicle. In the case where the shift position is in a reverse range, the forward clutch is disengaged, and the reverse brake is engaged. Consequently, the driveshaft rotates in a reverse rotation direction, which allows the reverse travel of the vehicle. Furthermore, in the case where the shift position is in a parking range or a neutral range, both of the forward clutch and the reverse brake are disengaged, and torque transmission by the forward/reverse changing clutch is blocked.

In the present specification, a state where the forward clutch or the reverse brake is engaged and thus torque can be transmitted to the driveshaft will also be referred to as an "in-gear state", and a state where both of the forward clutch and the reverse brake are disengaged and thus the torque transmission is blocked will also be referred to as an "out-gear state".

The engagement and the disengagement of each of the forward clutch and the reverse brake in such a transmission are switched by a transmission control unit. The transmission control unit detects the shift position selected by the driver and controls the forward/reverse changing clutch in accordance with the shift position. In the case of a gear shift system of a type in which the shift position is switched by a shift lever, the shift position is switched from the neutral range to the drive range at the time of making the forward travel of the vehicle. In this case, in accordance with the detected shift position, the transmission control unit engages the forward clutch from a state where both of the forward clutch and the reverse brake are disengaged. Meanwhile, when the vehicle makes the reverse travel, the shift position is switched from one of the parking range and the neutral range to the reverse range. In this case, in accordance with the detected shift position, the transmission control unit engages the reverse brake from the state where both of the forward clutch and the reverse brake are disengaged.

In the out-gear state where both of the forward clutch and the reverse brake are disengaged, an amount of the torque generated on a downstream side of the torque converter is small. Thus, even in the case where an amount of the engine output torque is small, an engine stall is unlikely to occur. Meanwhile, when the transmission is brought into the in-gear state where one of the forward clutch and the reverse brake is engaged, the amount of the torque generated on the downstream side of the torque converter is increased. Thus, the large amount of the engine output torque is requested to prevent the engine stall. In JP-A-2007-162939, as control to secure the engine output torque, torque reserve control is disclosed in which, when switching from the shift position corresponding to the out-gear state to the shift position corresponding to the in-gear state is detected, engine output is increased to secure the engine output torque.

SUMMARY OF THE INVENTION

In recent years, a gear shift system of a type in which the shift position is not switched by the shift lever but the shift position is switched by a button operation has been in practical use. By using such a gear shift system of the button type, the driver can freely select the shift position. That is, the gear shift system of the button type allows a mutual switching operation between the drive range and the reverse range without interposing the neutral range therebetween. For this reason, an engine control unit cannot execute the torque reserve control described above.

The present invention has been made in view of the above problem, and a purpose of the present invention is to provide a novel and improved vehicle control device capable of securing engine output torque even when a switching operation is performed between a first shift position and a second shift position, both of which correspond to an in-gear state.

In order to solve the above problem, according to one aspect of the present invention, a vehicle control device capable of performing a mutual switching operation between a first shift position and a second shift position, at both of which a power transmission system is in an in-gear state, is provided. The vehicle control device includes: a shift-position detecting section that detects a selected shift position; and a torque reserve control section that executes torque reserve control to increase output torque of an engine when a shift switching operation is performed between the first shift position and the second shift position.

As it has been described so far, according to the present invention, the engine output torque can be secured even in the case where the switching operation is performed between the first shift position and the second shift position at which one of a forward clutch and a reverse brake is in an engaged state.

BRIEF DESCRIPTION OF THE DRAWINGS

FIG. 1 is a schematic diagram of a power transmission system for a vehicle that is controlled by a vehicle control device according to an embodiment of the present invention.

FIG. 2 is an explanatory diagram of a configuration example of the vehicle control device according to the embodiment.

FIG. 3 is an explanatory graph of a relationship between an oil temperature and a torque reserve control period.

FIG. 4 is a flowchart of setting processing of the torque reserve control period.

FIG. 5 is a flowchart of setting processing of reserve torque.

FIG. 6 is a flowchart of torque reserve control processing.

FIG. 7 is a flowchart of the torque reserve control processing during an out-in switching operation.

FIG. 8 is a flowchart of the torque reserve control processing during an in-in switching operation.

FIG. 9 is a time chart of the case where the torque reserve control is not executed during the out-in switching operation.

FIG. 10 is a time chart of the case where the torque reserve control is executed during the out-in switching operation.

FIG. 11 is a time chart of the case where the torque reserve control is not executed during the in-in switching operation.

FIG. 12 is a time chart of the case where the torque reserve control is executed during the in-in switching operation.

DETAILED DESCRIPTION

A detailed description will hereinafter be made on a preferred embodiment of the present invention with reference to the accompanying drawings. In the specification and the drawings, components that have substantially the same functional configurations will be denoted by the same reference signs, and a description thereon will not be repeated. In the present specification, a switching operation of a shift position from the shift position in an out-gear state to the shift position in an in-gear state will also be referred to as an "out-in switching operation", and a switching operation of the shift position from the shift position in the in-gear state to the shift position in the in-gear state will also be referred to as an "in-in switching operation".

<1. Configuration Example of Power Transmission System>

First, a brief description will be made on a configuration example of a power transmission system for a vehicle, to which a vehicle control device according to this embodiment can be applied, with reference to FIG. 1. FIG. 1 is a schematic diagram of a power transmission system for a vehicle. Output torque from an engine 10 is transmitted to an unillustrated driveshaft via a transmission 20. The engine 10 is a gasoline engine, for example. The engine 10 is provided with a first rotation sensor 11 that detects a rotational frequency of a crankshaft. A sensor signal of the first rotation sensor 11 is output to an engine control unit (ECU) 50. A description will hereinafter be made on an example in which the gasoline engine is provided as the engine 10. Driving of an intake throttle valve, an ignition plug, a fuel injection valve, and the like of the engine 10 is controlled by the engine control unit 50, and an intake amount, ignition timing, a fuel injection amount thereof are controlled.

The transmission 20 has a torque converter 21, a forward/reverse changing clutch 23, and a gear shift mechanism 25. The torque converter 21 is a fluid coupling that transmits the output torque of the engine 10 to a downstream side via hydraulic oil. The forward/reverse changing clutch 23 has a forward clutch and a reverse brake, which are not illustrated, for example. Engagement and disengagement of each of the forward clutch and the reverse brake are switched by hydraulic control. A transmission control unit (TCU) 70 detects the shift position selected by a driver and controls the engagement or disengagement of the forward/reverse changing clutch 23. The vehicle, to which the vehicle control device according to this embodiment can be applied, includes a shift switching device of a button type. Such a shift switching device can freely switch the shift position among a parking range (P), a reverse range (R), a neutral range (N), and a drive range (D) by a button operation. The transmission 20 is provided with a second rotation sensor 27 that detects a rotational frequency of a turbine shaft transmitting the rotation from the torque converter 21 to the forward/reverse changing clutch 23. A sensor signal of the second rotation sensor 27 is output to the transmission control unit 70.

The gear shift mechanism 25 converts the torque, which is transmitted via the torque converter 21 and the forward/reverse changing clutch 23, at a desired gear ratio and transmits the torque to a downstream side. The gear shift mechanism 25 may be any type of a stepped type or a continuously variable type. For example, in the case where the gear shift mechanism 25 is a continuously variable transmission, a groove width between a primary pulley and a secondary pulley, around which an unillustrated drive chain is wound, is regulated by the hydraulic control, and the gear ratio is thereby regulated. A hydraulic pressure supplied to each actuation section of the transmission 20 is regulated when the transmission control unit (TCU) 70 controls an unillustrated flow rate control valve.

In such a power transmission system, in the out-gear state where the forward/reverse changing clutch 23 is disengaged, an amount of the torque generated on the downstream side of the torque converter 21 is small. Thus, the engine 10 can idle with low output. Meanwhile, in the in-gear state where the forward/reverse changing clutch 23 is engaged, the amount of the torque generated on the downstream side of the torque converter 21 is increased. Thus, the requested output for the engine 10 is increased. In the case where the output of the engine 10 is excessively low, an engine stall possibly occurs.

In the case where the shift position selected by the driver is switched from the parking range or the neutral range to the drive range, the forward clutch is engaged, and the amount of the torque on the downstream side of the torque converter 21 is thereby increased. Then, a magnitude of rotation resistance of the torque converter 21 is increased. Thus, in the case where the output of the engine 10 does not change, a speed of the engine 10 is reduced. Similarly, in the case where the shift position is switched from the parking range or the neutral range to the reverse range, the reverse brake is engaged, and the amount of the torque on the downstream side of the torque converter 21 is thereby increased. Then, the magnitude of the rotation resistance of the torque converter 21 is increased. Thus, in the case where the output of the engine 10 does not change, the speed of the engine 10 is reduced.

Furthermore, in the case where the shift position selected by the driver is directly switched between the drive range and the reverse range, in the forward/reverse changing clutch 23, an engaged state of the forward clutch or an engaged state of the reverse brake is switched via a neutral state where both of the forward clutch and the reverse brake are disengaged. Thus, even in the cases where the shift position is directly switched between the drive range and the reverse range and where a magnitude of the output of the engine 10 does not change at the time when the forward clutch or the reverse brake in the neutral state is engaged, the speed of the engine 10 is reduced. For this reason, the vehicle control device according to this embodiment suppresses a reduction in the speed of the engine 10 by executing torque reserve control to increase the output of the engine 10 at the time of switching the shift position.

<2. Configuration Example of Control System>

Next, a description will be made on a configuration example of a control system, to which the vehicle control device according to this embodiment can be applied, with reference to FIG. 2. FIG. 2 is a block diagram illustrating a functional configuration of a portion of a vehicle control system related to the torque reserve control. The control system includes the engine control unit 50 and the transmission control unit 70. The engine control unit 50 and the transmission control unit 70 are mutually communicable via a communication bus line such as a Controller Area Network (CAN). In this embodiment, the engine control unit 50 corresponds to the vehicle control device according to the present invention.

The transmission control unit 70 includes a control section 71 that is constructed of a microcomputer including a central processing unit (CPU) and the like. The control section 71 includes a shift-position detecting section 73, a clutch control section 75, and an oil temperature detecting section 77. Each of these sections may be a function that is realized when the microcomputer executes a software program. The transmission control unit 70 also includes unillustrated storage elements such as random access memory (RAM) and read only memory (ROM). The transmission control unit 70 receives a shift position signal Ssp output from a shift switching device 40 and an oil temperature signal Sto output from an oil temperature sensor 33. The oil temperature sensor 33 is provided at an appropriate position in a hydraulic circuit through which the hydraulic oil is supplied to the transmission 20.

The shift-position detecting section 73 detects the shift position selected in the shift switching device 40 on the basis of the received shift position signal Ssp. The oil temperature detecting section 77 detects a temperature (an oil temperature) To of the hydraulic oil supplied to the transmission 20 on the basis of the received oil temperature signal Sto. The clutch control section 75 outputs a drive instruction signal to a flow rate control valve drive section 79 that drives the flow rate control valve provided in a valve unit 31 of the transmission 20 on the basis of the detected shift position. For example, an electromagnetic control valve is used as the flow rate control valve. The clutch control section 75 controls the hydraulic pressure of the hydraulic oil supplied to each of the forward clutch and the reverse brake in the forward/reverse changing clutch 23, so as to control the engagement or the disengagement of each of the forward clutch and the reverse brake.

More specifically, when the drive range is selected, the clutch control section 75 disengages the reverse brake and engages the forward clutch. When the reverse range is selected, the clutch control section 75 disengages the forward clutch and engages the reverse brake. When the parking range or the neutral range is selected, the clutch control section 75 disengages both of the forward clutch and the reverse brake.

The engine control unit 50 includes a control section 51 that is constructed of the microcomputer including the CPU and the like. The control section 51 has a shift position information acquisition section 53 and a torque reserve control section 55. Each of these sections may be a function that is realized when the microcomputer executes a software program. The engine control unit 50 includes the unillustrated storage elements such as the RAM and the ROM.

The shift position information acquisition section 53 acquires information on the shift position from the transmission control unit 70 via the communication bus line 80. The shift position information acquisition section 53 may directly acquire the shift position signal Ssp from the shift switching device 40. Such a shift position information acquisition section 53 corresponds to a shift-position detecting section in the engine control unit 50 according to this embodiment.

The torque reserve control section 55 executes the torque reserve control in which the engine output torque is increased when a switching operation of the shift position to the drive range or the reverse range is performed. The torque reserve control section 55 executes the torque reserve control when the switching position of the shift position is performed from the parking range or the neutral range as the shift position in the out-gear state to the reverse range or the drive range as the shift position in the in-gear state (the out-in switching operation).

The torque reserve control section 55 further executes the torque reserve control when the shift position switching operation is performed between the drive range and the reverse range, both of which are the shift positions in the in-gear state (the in-in switching operation). Thus, even in the case where the selection of the parking range or the neutral range is not detected, the engine control unit 50 can suppress the reduction in the speed of the engine 10 at the time of switching from the out-gear state to the in-gear state of the power transmission system.

The torque reserve control section 55 of the engine control unit 50 according to this embodiment increases the engine output torque by outputting the drive instruction signal to a throttle valve drive section 61 that drives an intake throttle valve 13 and increasing the intake amount of the air that is introduced into a cylinder of the engine 10. Meanwhile, the forward clutch or the reverse brake is engaged in a delayed manner from a time when the shift position switching operation is detected. Thus, in the case where the intake amount is simply increased when the shift position switching operation is detected, the engine output torque is excessively increased, which possibly leads to a significant torque shock generated during the engagement of the forward clutch or the reverse brake. For this reason, the torque reserve control section 55 outputs a drive instruction signal to an ignition plug drive section 63, which drives an ignition plug 15 in conjunction with an increase in the intake amount, so as to delay the ignition timing.

That is, the control of the engine output torque by regulating the ignition timing realizes higher responsiveness than the control of the engine output torque by regulating the intake amount. Thus, the torque reserve control section 55 secures the appropriate engine output torque by regulating the ignition timing while securing the increase of the engine output torque realized by the increase in the intake amount. As a result, in a transition period of the forward/reverse changing clutch 23 from the neutral state to the in-gear state, the engine output torque can be increased while the speed of the engine 10 is maintained to be substantially constant. In addition, in the transition period of the forward/reverse changing clutch 23 from the neutral state to the in-gear state, while a magnitude of the torque shock is reduced, the reduction in the speed of the engine 10, which is caused by the increase in the torque generated on the downstream side of the torque converter 21, is suppressed.

The torque reserve control section 55 may execute the torque reserve control under different conditions from each other in a first switching state where the switching operation from the parking range or the neutral range to the drive range is performed, a second switching state where the switching operation from the parking range or the neutral range to the reverse range is performed, a third switching state where the switching operation from the reverse range to the drive range is performed, and a fourth switching state where the switching operation from the drive range to the reverse range is performed. Of these states, the third switching state and the fourth switching state are states where the mutual switching operation between a first shift position and a second shift position, both of which are in the in-gear state in the power transmission system, is performed.

For example, in the first switching state or the second switching state, the forward clutch or the reverse brake is engaged from the neutral state of the forward/reverse changing clutch 23. Meanwhile, in the third switching state or the fourth switching state, the reverse brake or the forward clutch is disengaged from the engaged state, and then an engaging operation of the forward clutch or the reverse brake is performed. In such a case, a torque reserve control period in each of the third switching state and the fourth switching state may be set to be longer than the torque reserve control period in each of the first switching state and the second switching state. The torque reserve control section 55 can execute the torque reserve control by selecting the torque reserve control period, which is set in advance for each of the first switching state to the fourth switching state.

In the case where a length and capacity of an oil channel through which the hydraulic pressure is supplied to the forward clutch of the forward/reverse changing clutch 23 differs from a length and capacity of an oil channel through which the hydraulic pressure is supplied to the reverse brake thereof, periods from time at which the clutch control section 75 of the transmission control unit 70 outputs the drive instruction signal to the flow rate control valve drive section 79 to time at which the forward clutch and the reverse brake actually start being engaged possibly differ. Thus, the torque reserve control section 55 may change the torque reserve control period for each of the first switching state to the fourth switching state described above in accordance with the length or the capacity of each of the oil channels. In such a case, the torque reserve control period may be set to be longer in proportion to a period from time at which the clutch control section 75 starts supplying the hydraulic pressure to the forward clutch or the reverse brake to time at which the forward clutch or the reverse brake is engaged. The torque reserve control period in each of the switching states can be set on the basis of data on a time for engaging each of the forward clutch and the reverse brake that is measured by using an actual system in advance, for example.

Alternatively, the torque reserve control section 55 may set the torque reserve control period on the basis of the oil temperature To of the hydraulic oil that is supplied to the transmission 20. That is, the torque reserve control section 55 may regulate the torque reserve control period in each of the switching states described above on the basis of the oil temperature To. Viscosity of the hydraulic oil differs by the oil temperature To, and an increasing speed of the hydraulic pressure supplied to the forward clutch or the reverse brake differs by the oil temperature To. Thus, the periods from the time at which the clutch control section 75 outputs the drive instruction signal to the flow rate control valve drive section 79 to the time at which the forward clutch and the reverse brake actually start being engaged possibly differ. For this reason, when the torque reserve control period is appropriately regulated on the basis of the oil temperature To, it is possibly to reduce a possibility that the amount of the engine output torque is reduced during the engagement of the forward clutch or the reverse brake.

FIG. 3 illustrates a relationship between the oil temperature To and the torque reserve control period. When the oil temperature To is low, the viscosity of the hydraulic oil is increased, and friction loss in the torque converter 21 is increased. As a result, torque transmission efficiency in the torque converter 21 is likely to be degraded. Thus, as the oil temperature To is lowered, the torque reserve control period is possibly set to be longer. The torque reserve control section 55 possibly acquires information on the oil temperature To from the transmission control unit 70 via the communication bus line 80. Alternatively, the torque reserve control section 55 may directly acquire the oil temperature signal Sto from the oil temperature sensor 33.

In addition, the torque reserve control section 55 may set the engine output torque that is increased at the time of executing the torque reserve control (hereinafter also referred to as "reserve torque") on the basis of the oil temperature To. As described above, when the oil temperature To is low, the viscosity of the hydraulic oil is increased, and the torque transmission efficiency in the torque converter 21 is likely to degrade. Thus, the torque reserve control section 55 may set the reserve torque to be larger as the oil temperature To is lowered, so as to secure the torque that is transmitted to the downstream side of the torque converter 21 when the power transmission system is switched from the out-gear state to the in-gear state.

<3. Torque Reserve Control Processing>

Next, a description will be made on a specific example of torque reserve control processing by the engine control unit 50 according to this embodiment with reference to FIG. 4 to FIG. 8.

(3-1. Torque Reserve Control Period Setting Processing)

FIG. 4 is a flowchart of torque reserve control period setting processing. The torque reserve control section 55 detects the oil temperature To (step S11), and next respectively sets torque reserve control periods T1, T2, T3, T4 for the first switching state to the fourth switching state on the basis of the oil temperature To and stores torque reserve control periods T1, T2, T3, T4 in the storage element (step S13). Such torque reserve control period setting processing may repeatedly be executed for each processing cycle of the microcomputer, for example, or may only be executed when a change of the oil temperature To is equal to or larger than a specified threshold value. In either case, the torque reserve control periods T1, T2, T3, T4 for the first switching state to the fourth switching state are in states of being always set.

(3-2. Reserve Torque Setting Processing)

FIG. 5 is a flowchart of reserve torque setting processing. The torque reserve control section 55 detects the oil temperature To (step S21), and next sets the reserve torque on the basis of the oil temperature To and stores the reserve torque in the storage element (step S23). Such reserve torque setting processing may repeatedly be executed for each processing cycle of the microcomputer, for example, or may only be executed when the change of the oil temperature To is equal to or larger than the specified threshold value. In either case, a value of the reserve torque to be increased is in the state of being always set.

(3-3. Torque Reserve Control Processing)

FIG. 6 to FIG. 8 are flowcharts of the torque reserve control processing. FIG. 6 is a flowchart of shift position switching operation determination processing, FIG. 7 is a flowchart of the torque reserve control processing during the shift position switching operation from the out-gear state to the in-gear state, and FIG. 8 is a flowchart of the torque reserve control processing during the shift position switching operation from the in-gear state to the in-gear state.

The torque reserve control section 55 determines whether the shift position switching operation has been performed on the basis of the information on the shift position (step S31). If the shift position switching operation has not been performed (S31: No), the torque reserve control section 55 repeats the determination processing in step S31. If the shift position switching operation has been made (S31: Yes), the torque reserve control section 55 determines whether the shift position before the switching operation is the parking range or the neutral range (step S33). If the shift position before the switching operation is the parking range or the neutral range (S33: Yes), the torque reserve control section 55 makes the processing proceed to step S41 in the flowchart illustrated in FIG. 7. On the other hand, if the shift position before the switching operation is neither the parking range nor the neutral range (S33: No), the torque reserve control section 55 makes the processing proceed to step S61 in the flowchart illustrated in FIG. 8.

If the shift position before the switching operation is the parking range or the neutral range (S33: Yes), the torque reserve control section 55 determines whether the current shift position after the switching operation is the drive range (step S41). If the current shift position is the drive range (S41: Yes), it is in the state where the switching operation from the shift position in the out-gear state to the drive range in the in-gear state has been performed (the first switching state), and the torque reserve control section 55 selects the torque reserve control period T1 and sets a timer value (step S43).

On the other hand, if the current shift position is not the drive range (S41: No), the torque reserve control section 55 determines whether the current shift position is the reverse range (step S51). If the current shift position is the reverse range (S51: Yes), it is in the state where the switching operation from the shift position in the out-gear state to the drive range in the in-gear state has been performed (the second switching state), and the torque reserve control section 55 selects the torque reserve control period T2 and sets the timer value (step S53).

When the timer value is set in step S43 or step S53, the torque reserve control section 55 outputs the drive instruction signal to the throttle valve drive section 61 and the ignition plug drive section 63 so as to initiate the torque reserve control, and starts timer count (counting down) (step S45). Next, the torque reserve control section 55 determines whether a timer value T becomes 0 (step S47). The determination processing in step S47 is repeated until the timer value T becomes 0 (S47: No). If the timer value T becomes 0 (S47: Yes), the torque reserve control section 55 cancels the torque reserve control (step S49). Thereafter, the processing returns to step S31, and the torque reserve control section 55 repeats the torque reserve control processing.

If the current shift position is not the reverse range in above step S51 (S51: No), it is not a situation where the forward clutch or the reverse brake in the forward/reverse changing clutch 23 is engaged, and thus the torque reserve control does not have to be executed. Thus, the torque reserve control section 55 terminates this routine as is, the processing returns to step S31, and the torque reserve control processing is repeated.

On the other hand, if the shift position before the switching operation is neither the parking range nor the neutral range in above step S33 (S33: No), the torque reserve control section 55 determines whether the shift position before the switching operation is the reverse range (step S61). If the shift position before the switching operation is the reverse range (S61: Yes), the torque reserve control section 55 determines whether the current shift position is the drive range (step S63). If the current shift position is the drive range (S63: Yes), it is in the state where the switching operation from the reverse range in the in-gear state to the drive range in the same in-gear state has been performed (the third switching state), and the torque reserve control section 55 selects the torque reserve control period T3 and sets the timer value (step S65).

On the other hand, if the shift position before the switching operation is not the reverse range in above step S61 (S61: No), the torque reserve control section 55 determines whether the shift position before the switching operation is the drive range (step S73). If the shift position before the switching operation is the drive range (S73: Yes), the torque reserve control section 55 determines whether the current shift position is the reverse range (step S75). If the current shift position is the reverse range (S75: Yes), it is in the state where the switching operation from the reverse range in the in-gear state to the drive range in the same in-gear state has been performed (the fourth switching state), and the torque reserve control section 55 selects the torque reserve control period T4 and sets the timer value (step S77).

When the timer value is set in step S65 or step S77, the torque reserve control section 55 outputs the drive instruction signal to the throttle valve drive section 61 and the ignition plug drive section 63 so as to initiate the torque reserve control, and starts the timer count (counting down) (step S67). Next, the torque reserve control section 55 determines whether the timer value T becomes 0 (step S69). The determination processing in step S69 is repeated until the timer value T becomes 0 (S69: No). If the timer value T becomes 0 (S69: Yes), the torque reserve control section 55 cancels the torque reserve control (step S71). Thereafter, the processing returns to step S31, and the torque reserve control section 55 repeats the torque reserve control processing.

If the current shift position is not the drive range in above step S63 (S63: No), it is not in the situation where the forward clutch or the reverse brake in the forward/reverse changing clutch 23 is engaged, and thus the torque reserve control does not have to be executed. Similarly, if the current shift position is not the reverse range in above step S75 (S75: No), it is not the situation where the forward clutch or the reverse brake in the forward/reverse changing clutch 23 is engaged, and thus the torque reserve control does not have to be executed. Furthermore, if the shift position before the switching operation is not the drive range in above step S73 (S73: No), it is in a situation where the shift position before the switching operation is not identified, and thus the torque reserve control is not executed. Thus, the torque reserve control section 55 terminates this routine as is, the processing returns to step S31, and the torque reserve control processing is repeated.

The torque reserve control processing is executed as described above. Thus, not only in the case where the driver performs the switching operation from the shift position in the out-gear state to the shift position in the in-gear state, but also in the case where the driver performs the switching operation from the shift position in the in-gear state to the shift position in the same in-gear state, the torque reserve control is executed. Thus, when the shift position switching operation to the drive range or the reverse range is performed, the forward clutch or the reverse brake is engaged. As a result, it is possible to suppress the reduction in the speed of the engine 10 caused by the increase in the torque generated on the downstream side of the torque converter 21.

(3-4. Operating State of Power Transmission System)

Next, a description will be made on an operating states of the power transmission system in the cases where the torque reserve control is executed and not executed by the engine control unit 50 according to this embodiment with reference to FIG. 9 to FIG. 12.

(3-4-1. First Switching State and Second Switching State)

FIG. 9 and FIG. 10 each illustrate the operating state of the power transmission system in the case where the switching operation from the shift position in the out-gear state to the shift position in the in-gear state is performed. FIG. 9 illustrates the operating state in the case where the torque reserve control is not executed, and FIG. 10 illustrates the operating state in the case where the torque reserve control is executed.

For example, it is assumed that the driver selects the parking range or the neutral range and the engine 10 is in an idling state. In this case, the shift position information acquisition section 53 of the engine control unit 50 acquires the information indicating that the shift position is the parking range or the neutral range in the out-gear state. At this time, the forward/reverse changing clutch 23 is in the out-gear state where both of the forward clutch and the reverse brake are disengaged, and an engine speed Ne matches a turbine rotational frequency Nt on the downstream side of the torque converter 21.

It is assumed that, at time Ti1, the driver selects the drive range or the reverse range in the in-gear state. In this case, the shift position information acquisition section 53 detects that the shift position is switched to the drive range or the reverse range in the in-gear state. At this time, the transmission control unit 70 controls the valve unit 31 to supply the hydraulic pressure to the forward clutch or the reverse brake in conjunction with switching of the shift position. However, although the hydraulic pressure starts being supplied to the forward clutch or the reverse brake at the time Ti1, the forward clutch or the reverse brake actually starts being engaged at time Ti2. Thus, a time difference occurs.

As illustrated in FIG. 9, in the case where the torque reserve control is not executed, the amount of the torque on the downstream side that is received by the turbine shaft of the torque converter 21 starts being increased, and the turbine rotational frequency Nt starts being reduced when the forward clutch or the reverse brake starts being engaged at the time Ti2. The increase in the torque generated on the downstream side of the torque converter 21 and the reduction in the turbine rotational frequency Nt continue until time Ti4 at which the engagement of the forward clutch or the reverse brake is completed. Due to the increase in the torque generated on the downstream side of the torque converter 21, the rotation resistance of the torque converter 21 is increased. As a result, the engine speed Ne is reduced at time Ti3. When detecting the reduction in the engine speed Ne, the engine control unit increases an opening degree of the intake throttle valve 13 and advances an ignition angle such that the engine speed Ne is maintained at an idle speed. In this way, the engine output torque is increased, and the engine speed Ne is recovered.

Meanwhile, as illustrated in FIG. 10, in the case where the torque reserve control is executed, the engine control unit 50 starts executing the torque reserve control when detecting the shift position switching operation at the time Ti1. In the example illustrated in FIG. 10, the engine control unit 50 increases the opening degree of the intake throttle valve 13 and delays the ignition angle, so as to generate the reserve torque of the engine 10. Then, the engine control unit 50 increases the engine output torque in a period until the time Ti2 at which the forward clutch or the reverse brake starts being engaged (the torque reserve control period). Thus, even in the case where the turbine rotational frequency Nt starts being reduced due to a start of the engagement of the forward clutch or the reverse brake at the time Ti2, the reduction in the engine speed Nt is suppressed. At the time Ti2, at which the forward clutch or the reverse brake starts being engaged, the torque reserve control is canceled, and the reserve torque of the engine 10 gradually returns to zero.

(3-4-2. Third Switching State and Fourth Switching State)

FIG. 11 and FIG. 12 each illustrate the operating state of the power transmission system in the case where the switching operation from the shift position in the in-gear state to the shift position in the same in-gear state is performed. FIG. 11 illustrates the operating state in the case where the torque reserve control is not executed, and FIG. 12 illustrates the operating state in the case where the torque reserve control is executed.

For example, it is assumed that the driver selects the drive range and the engine 10 is in the idling state. In this case, the shift position information acquisition section 53 of the engine control unit 50 acquires the information indicating that the shift position is the drive range in the in-gear state. At this time, the forward/reverse changing clutch 23 is in the in-gear state where the forward clutch is engaged while the reverse brake is disengaged, and the turbine rotational frequency Nt is lower than the engine speed Ne due to the torque generated on the downstream side of the torque converter 21.

It is assumed that, at time Ti11, the driver selects the reverse range in the in-gear state. In this case, the shift position information acquisition section 53 detects that the shift position is switched to the reverse range in the in-gear state. At this time, the transmission control unit 70 controls the valve unit 31 to stop supplying the hydraulic pressure to the forward clutch and supply the hydraulic pressure to the reverse brake in conjunction with switching of the shift position. However, although engagement/disengagement switching of the forward/reverse changing clutch 23 starts at the time Ti11, the reverse brake actually starts being engaged at the time Ti2. Thus, the time difference occurs. The switching operation is performed from the drive range in the in-gear state to the reverse range in the same in-gear state. In this case, the forward/reverse changing clutch 23 is once brought into the out-gear state (the neutral state) at time Ti12, and is again brought into the in-gear state at time Ti13. In this period, the torque on the downstream side that is received by the turbine shaft of the torque converter 21 is once reduced and then increased again. In conjunction with this, the turbine rotational frequency Nt is once increased and then reduced again.

As illustrated in FIG. 11, in the case where the torque reserve control is not executed, the amount of the torque on the downstream side that is received by the turbine shaft starts being reduced, and the turbine rotational frequency Nt starts being increased when the forward clutch starts being disengaged at the time Ti12. When the forward clutch is completely disengaged, the amount of the torque on the downstream side that is received by the turbine shaft becomes 0. However, when the reverse brake starts being engaged at the time Ti13, the amount of the torque on the downstream side that is received by the turbine shaft starts being increased again, and the turbine rotational frequency Nt starts being reduced. The increase in the torque generated on the downstream side of the torque converter 21 and the reduction in the turbine rotational frequency Nt continue until time Ti15 at which the engagement of the reverse brake is completed. Due to the increase in the torque generated on the downstream side of the torque converter 21, the rotation resistance of the torque converter 21 is increased. As a result, the engine speed Ne is reduced at time Ti14. When detecting the reduction in the engine speed Ne, the engine control unit 50 increases the opening degree of the intake throttle valve 13 and advances the ignition angle such that the engine speed Ne is maintained at the idle speed. In this way, the engine output torque is increased, and the engine speed Ne is recovered.

Meanwhile, as illustrated in FIG. 12, in the case where the torque reserve control is executed, the engine control unit 50 starts executing the torque reserve control when detecting the shift position switching operation at the time Ti11. In the example illustrated in FIG. 12, the engine control unit 50 increases the opening degree of the intake throttle valve 13 and delays the ignition angle, so as to generate the reserve torque of the engine 10. Then, the engine control unit 50 increases the engine output torque in a period until the time Ti13 at which the forward clutch is disengaged and the reverse brake further starts being engaged (the torque reserve control period). Thus, even in the case where the turbine rotational frequency Nt starts being reduced due to the start of the engagement of the reverse brake at the time Ti13, the reduction in the engine speed Ne is suppressed. At the time Ti13, at which the reverse brake starts being engaged, the torque reserve control is canceled, and the reserve torque of the engine 10 gradually returns to zero.

As it has been described so far, the engine control unit 50 according to this embodiment executes the torque reserve control not only in the case where the switching operation from the shift position in the out-gear state to the shift position in the in-gear state is performed, but also in the case where the switching operation from the shift position in the in-gear state to the shift position in the same in-gear state is performed. Thus, the reduction in the speed of the engine 10, which is caused by the increase in the torque generated on the downstream side of the torque converter 21, is suppressed when the forward clutch or the reverse brake is engaged from the neutral state of the forward/reverse changing clutch 23.

In addition, the engine control unit 50 according to this embodiment increases the intake amount and delays the ignition timing, so as to make the engine 10 generate the reserve torque. The regulation of the ignition timing by the ignition plug 15 realizes higher responsiveness to the engine output torque than the regulation of the opening degree of the intake throttle valve 13. Thus, the reserve torque can be regulated with a relatively high degree of accuracy by the engine control unit 50.

Furthermore, the engine control unit 50 according to this embodiment sets the torque reserve control period and the reserve torque at the time of executing the torque reserve control on the basis of the oil temperature To. Thus, the torque reserve control is executed in accordance with the difference in the increasing speed of the hydraulic pressure caused by the difference in the viscosity of the hydraulic oil and in accordance with the difference in the torque transmission efficiency in the torque converter 21.

The preferred embodiment of the present invention has been described in detail so far with reference to the accompanying drawings. However, the present invention is not limited to such an embodiment. It is obvious that a person who has basic knowledge in the technical field to which the invention pertains could have easily arrived at various modification examples and application examples that fall within the scope of the technical idea described in the claims. It is understood that those naturally fall within the technical scope of the present invention.

REFERENCE SIGNS LIST

10: Engine
13: Intake throttle valve
15: Ignition plug
20: Transmission
21: Torque converter
23: Forward/reverse changing clutch
25: Gear shift mechanism
40: Shift switching device
50: Engine control unit
53: Shift position information acquisition section
55: Torque reserve control section
70: Transmission control unit
73: Shift-position detecting section
75: Clutch control section

The invention claimed is:

1. A vehicle control device capable of performing a mutual switching operation between a first shift position and a second shift position, at both of which a power transmission system is in an in-gear state, the vehicle control device comprising:
   a shift-position detecting section that detects a selected shift position; and
   a torque reserve control section that executes torque reserve control to increase output torque of an engine when a shift switching operation is performed between the first shift position and the second shift position,
   wherein the torque reserve control section further executes the torque reserve control when the shift switching operation is performed from a shift position at which the power transmission system is in an out-gear state to the first shift position or the second shift position.

2. A vehicle control device capable of performing a mutual switching operation between a first shift position and a second shift position, at both of which a power transmission system is in an in-gear state, the vehicle control device comprising:
   a shift-position detecting section that detects a selected shift position; and
   a torque reserve control section that executes torque reserve control to increase output torque of an engine when a shift switching operation is performed between the first shift position and the second shift position;
   wherein the torque reserve control section initiates the torque reserve control when the shift switching operation is performed between the first shift position and the second shift position, and continues the torque reserve control until the power transmission system is actually switched from an out-gear state to the in-gear state.

3. The vehicle control device according to claim 2, wherein
   the torque reserve control section further executes the torque reserve control when the shift switching operation is performed from a shift position at which the power transmission system is in the out-gear state to the first shift position or the second shift position.

4. A vehicle control device capable of performing a mutual switching operation between a first shift position and a second shift position, at both of which a power transmission system is in an in-gear state, the vehicle control device comprising:
   a shift-position detecting section that detects a selected shift position; and
   a torque reserve control section that executes torque reserve control to increase output torque of an engine when a shift switching operation is performed between the first shift position and the second shift position,
   wherein the torque reserve control section further executes the torque reserve control when the shift switching operation is performed from a shift position at which the power transmission system is in an out-gear state to the first shift position or the second shift position, and
   wherein the torque reserve control section executes the torque reserve control by selecting either one of a control period for the shift switching operation between the first shift position and the second shift position and a control period for the shift switching operation from the shift position in the out-gear state to the first shift position or the second shift position, both of the periods being set in advance.

5. The vehicle control device according to claim 4, wherein
the torque reserve control section sets the control period for the shift switching operation between the first shift position and the second shift position and the control period for the shift switching operation from the shift position in the out-gear state to the first shift position or the second shift position on the basis of an oil temperature of hydraulic oil in an automatic transmission.

6. The vehicle control device according to claim 1, wherein
the torque reserve control section sets a value of reserve torque on the basis of the oil temperature in the automatic transmission.

7. The vehicle control device according to claim 6, wherein
the torque reserve control section increases the output torque of the engine by controlling an intake amount and an ignition angle of the engine.

8. The vehicle control device according to claim 4, wherein the torque reserve control section sets a value of reserve torque on the basis of the oil temperature in the automatic transmission.

9. The vehicle control device according to claim 4, wherein the torque reserve control section increases the output torque of the engine by controlling an intake amount and an ignition angle of the engine.

10. The vehicle control device according to claim 3, wherein the torque reserve control section executes the torque reserve control by selecting either one of a control period for the shift switching operation between the first shift position and the second shift position and a control period for the shift switching operation from the shift position in the out-gear state to the first shift position or the second shift position, both of the periods being set in advance.

11. The vehicle control device according to claim 10, wherein the torque reserve control section sets a value of reserve torque on the basis of the oil temperature in the automatic transmission.

12. The vehicle control device according to claim 11, wherein the torque reserve control section increases the output torque of the engine by controlling an intake amount and an ignition angle of the engine.

13. The vehicle control device according to claim 2, wherein the torque reserve control section sets a value of reserve torque on the basis of the oil temperature in the automatic transmission.

14. The vehicle control device according to claim 13, wherein the torque reserve control section increases the output torque of the engine by controlling an intake amount and an ignition angle of the engine.

15. The vehicle control device according to claim 2, wherein the torque reserve control section increases the output torque of the engine by controlling an intake amount and an ignition angle of the engine.

16. The vehicle control device according to claim 1, wherein a control period for the shift switching operation is set in advance.

17. The vehicle control device according to claim 1, wherein in the out of gear state both of a forward clutch and a reverse brake are disengaged and thus the torque transmission is blocked.

* * * * *